3,264,290
BASIC ETHERS OF HYDROXYETHYLPIPERAZINO-
PROPYLPHENOTHIAZINES
Jack Bernstein and Harry Louis Yale, New Brunswick,
N.J., assignors, by mesne assignments, to E. R. Squibb
& Sons, Inc., New York, N.Y., a corporation of Delaware
No Drawing. Filed Feb. 28, 1963, Ser. No. 261,866
10 Claims. (Cl. 260—243)

This invention relates to new ethers of phenothiazines having valuable therapeutic properties, and processes for the preparation thereof.

The new therapeutically active compounds of this invention include phenothiazines of the general formula:

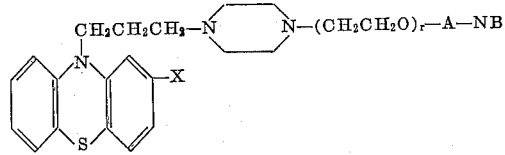

and non-toxic acid-addition salts thereof; wherein $r$ is 1 or 2; X is hydrogen, halogen (preferably chloro), trifluoromethyl, lower alkyl, lower alkoxy, lower alkanoyl, lower alkyl mercapto, trifluoromethylmercapto trifluoromethoxy, N,N-dimethylaminosulfonyl and lower alkylsulfonyl (preferably methylsulfonyl); A is a lower alkylene radical of at least two carbon atoms; and NB is a basic saturated nitrogen-containing radical of less than seventeen carbon atoms. Among the suitable radicals represented by the symbol NB are:

amino;
(lower alkyl)amino;
di(lower alkyl)amino;
(hydroxy-lower alkyl)amino;
di-(hydroxy-lower alkyl)amino;
and basic saturated 5 to 7 membered monocyclic N-heterocyclic radicals of less than seventeen carbon atoms, as exemplified by
piperidino;
(lower alkyl)piperidino [e.g., 2, 3 or 4-(lower alkyl) piperidino];
di(lower alkyl)piperidino[e.g., 2,4-, 2,5- or 3,5-di(lower alkyl)-piperidino];
(lower alkoxy)piperidino;
homopiperidino;
pyrrolidino;
(lower alkyl)pyrrolidino;
di(lower alkyl)pyrrolidino;
(lower alkoxy)pyrrolidino;
morpholino;
(lower alkyl)morpholino;
di(lower alkyl)morpholino;
(lower alkoxy)morpholino;
thiamorpholino;
(lower alkyl)-thiamorpholino;
di(lower alkyl)thiamorpholino;
(lower alkoxy)thiamorpholino;
piperazino;
(lower alkyl)piperazino (e.g., $N^4$-methylpiperazino);
di(lower alkyl)piperazino;
(lower alkoxy)piperazino;
(hydroxyl-lower alkyl)piperazino [e.g., $N^4$-(2-hydroxyethyl)piperazino];
(alkanoyloxy-lower alkyl)piperazino [e.g., $N^4$-(2-acetoxyethyl)piperazino and
$N^4$-(2-heptanoyloxyethyl)piperazino];
(hydroxy-lower alkoxy-lower alkyl)piperazino [e.g., $N^4$-(2-hydroxyethyl)piperazino];
(alkenoyloxy-lower alkyl)piperazino [e.g., $N^4$-(2-undecylenoyloxyethyl)piperazino];
(carbo-lower alkoxy)piperazino [e.g., $N^4$-(2-carbomethoxy, carboethoxy or carbopropoxy)piperazino];
homopiperazino; and
$N^4$-(lower alkyl)homopiperazino (e.g., $N^4$-methylhomopiperazino).

The terms "lower alkyl," "lower alkoxy" and "lower alkylene," as employed herein, include both straight and branched chain radicals of less than eight carbon atoms. The particularly preferred compounds are those wherein A is a lower alkylene radical of two to three carbon atoms (e.g., ethylene, trimethylene 1,3 and propylene-1,2); NB represents a di(lower alkyl)-amino radical; $r$ is one and X is chloro or trifluoromethyl.

As to salts of the bases of this invention, those coming within the purview of this invention include the acid-addition salts, particularly, the non-toxic acid-addition salts. Acids useful for preparing the acid-addition salts, include, inter alia, inorganic acids, such as the hydrohalic acids (e.g., hydrochloric and hydrobromic acid), sulfuric acid, nitric acid and phosphoric acid, and organic acids, such as oxalic, maleic, fumaric, tartaric, citric, acetic, succinic and pamoic acid.

The compounds of this invention are therapeutially active compounds which are utilizable both as tranquilizing (ataractic) agents, and thus may be used in the treatment of depressed psychotic states, and as antihistamines. For these purposes they may be administered orally or parenterally in conventional dosage forms such as tablets, capsules, injectables or the like by incorporating the appropriate dose of the compound with carriers according to accepted pharmaceutical practice. The compounds of this invention are superior to known phenothiazine tranquilizing agents in that they possess an antagonism to the extrapyramidal syndrome, a side-effect frequently associated with therapy by these agents.

The compounds of this invention can be prepared by interacting a compound of the general Formula I:

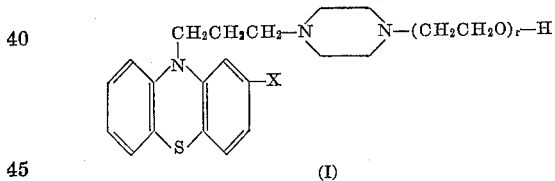

(I)

wherein X and $r$ are as hereinbefore defined, with an aminoalkyl halide (preferably aminoalkyl chloride) of the formula: Y—A—NB, wherein Y is halo and A and NB are as hereinbefore defined, the reaction preferably being conducted in an organic solvent, benzene, toluene or tetrahydrofuran for the reactants in the presence of a basic compound, such as sodium hydride. Among the suitable phenothiazine reactants may be mentioned:

10-[3-(2-hydroxyethyl)piperazinopropyl]phenothiazine;
10-[3-(2-hydroxyethyl)piperazinopropyl]-2-halo-phenothiazines, such as
10-[3-(2-hydroxyethyl)piperazinopropyl]-2-chloro-phenothiazine;
10-[3-(2-hydroxyethyl)piperazinopropyl]-2-trifluoromethylphenothiazine;
10-[3-(2-hydroxyethoxyethyl)-piperazinopropyl]-2-halo-phenothiazines, such as
10-[3-(2-hydroxyethoxyethyl)piperazinopropyl-2-chlorophenothiazine;
10-[3-(2-hydroxyethoxyethyl)piperazinopropyl]-2-(trifluoromethyl)phenothiazine;
10-[3-(2-hydroxyethyl)piperazinopropyl]-2-(lower alkyl)-phenothiazines, such as
10-[3-(2-hydroxyethyl)piperazinopropyl]-2-methylphenothiazine;

10-[3-(2-hydroxyethyl)piperazinopropyl]-2-(lower alkoxy)phenothiazines, such as
10-[3-(2-hydroxyethyl)-piperazinopropyl]-2-methoxyphenothiazine;
10-[3-(2-hydroxyethyl)piperazinopropyl]-2-(lower alkanoyl)phenothiazines, such as
10-[3-(2-hydroxyethyl)piperazinopropyl]-2-propionylphenothiazine;
10-[3-(2-hydroxyethyl)piperazinopropyl]-2-(lower alkyl mercapto)-phenothiazines, such as
10-[3-(2-hydroxyethyl)piperazinopropyl]-2-methylmercaptophenothiazine;
10-[3-(2-hydroxyethyl)-piperazinopropyl]-2-trifluoromethylmercaptophenothiazine;
10-[3-(2-hydroxyethyl)piperazino propyl]-2-trifluoromethoxyphenothiazine;
10-[3-(2-hydroxyethyl)piperazinopropyl]-2-methylsulfonylphenothiazine and
10-[3-(2-hydroxyethyl)piperazinopropyl]-2-N,N-dimethylaminosulfonylphenothiazine.

Alternatively, the compounds of this invention can be prepared by interacting a compound of the General Formula II:

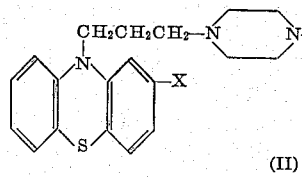

(II)

wherein X and r are as hereinbefore defined and Z is halogen, preferably chlorine or bromine, with an amino alcohol of the formula: HO—A—NB, wherein A and NB are as hereinbefore defined, in the presence of a condensing agent such as sodium hydride, in an organic solvent, such as toluene or tetrahydrofuran. The compounds of Formula II can be prepared as disclosed in application, Serial No. 254,459, filed January 28, 1963, now Patent No. 3,194,733, granted July 13, 1965, by interacting a compound of Formula I with a thionyl halide such as thionyl chloride and thionyl bromide.

Among the suitable phenothiazine reactants of the Formula II may be mentioned:

10-[3-(2-chloroethyl)piperazinopropyl]phenothiazine;
10-[3-(2-bromoethyl)piperazinopropyl]-2-halophenothiazines, such as
10-[3-(2-bromoethyl)piperazinopropyl]-2-chlorophenothiazine;
10-[3-(2-bromoethyl)piperazinopropyl]-2-(trifluoromethyl)phenothiazine;
10-[3-(2-chloroethoxyethyl)piperazinopropyl]-2-halophenothiazines, such as
10-[3-(2-chloroethoxyethyl)piperazinopropyl]-2-chlorophenothiazine;
10-[3-(2-chloroethoxyethyl)piperazinopropyl]-2-(trifluoromethyl)-phenothiazine;
10-[3-(2-chloroethyl)piperazinopropyl]-2-(lower alkyl)-phenothiazines, such as
10-[3-(2-chloroethyl(piperazinopropyl]-2-methylphenothiazine;
10-[3-(2-chloroethyl)piperazinopropyl]-2-(lower alkoxy)phenothiazines, such as
10-[3-(2-chloroethyl)piperazinopropyl]-2-methoxyphenothiazine;
10-[3-(2-chloroethyl)piperazinopropyl]-2-(lower alkanoyl)phenothiazines, such as
10-[3-(2-chloroethyl)piperazinopropyl]-2-propionylphenothiazine;
10-[3-(2-chloroethyl)-piperazinopropyl]-2-(lower alkyl mercapto)phenothiazines, such as
10[3-(2-chloroethyl)piperazinopropyl]-2-methylmercaptophenothiazine;
10-[3-(2-chloroethyl)piperazinopropyl]-2-trifluoromethylmercaptophenothiazine;
10-[3-(2-chloroethyl)piperazinopropyl]-2-trifluoromethoxyphenothiazine;
10-[3-(2-chloroethyl)piperazinopropyl]-2-methylsulfonylphenothiazine and
10-[3-(2-chloroethyl)piperazinopropyl]-2-N,N-dimethylaminosulfonylphenothiazine.

The compounds of this invention can also be prepared by interacting a compound of the Formula II with an alkali metal aminoalcoholate of the general formula: MO—A—NB, wherein A and NB are as hereinbefore defined and M is sodium or potassium, in an organic solvent, such as toluene or tetrahydrofuran.

In addition, the compounds of this invention can be prepared by first interacting a compound of the general Formula II with a halo-lower alkanol to give a compound of the general Formula III:

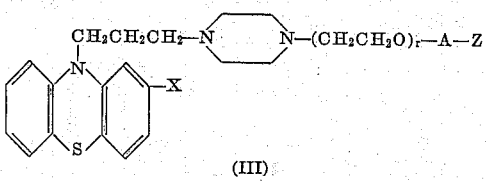

(III)

wherein X, r, A and Z are as hereinbefore defined, and then interacting a compound of the general Formula III with a compound of the general structure: HNB, wherein NB is as hereinbefore defined.

The compounds of this invention can also be prepared by interacting a compound of the general Formula IV:

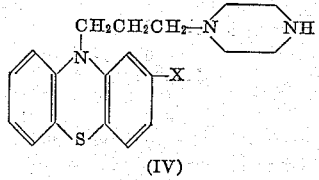

(IV)

wherein X is as hereinbefore defined, with a compound of the general formula: Z—(CH$_2$CH$_2$O)$_r$—A—NB, wherein Z, r, A and NB are as hereinbefore defined, in an organic solvent, such as benzene, toluene, methyl ethyl ketone or tetrahydrofuran in the presence of a basic compound, such as barium hydroxide.

The free bases of this invention can be converted to acid-addition salts by treatment with the desired acid. This reaction is preferably conducted in an inert organic solvent under substantially anhydrous conditions by treating the base with the acid, whereby the acid-addition salt is formed.

The following examples illustrate the invention (all temperatures being in centigrade):

EXAMPLE 1

4-{3-[2-(trifluoromethyl)phenothiazine-10-yl]propyl}-piperazinoethyl 2-dimethylaminoethyl ether (a) *Preparation of 4-{3-[2-(trifluoromethyl)phenothiazine-10-yl]propyl}-piperazinoethyl 2-dimethylaminoethyl ether, hydrochloride salt.*— To 32.8 g. of 4-{3-[2-(trifluoromethyl)phenothiazin - 10 - yl] - propyl}piperazinoethanol in 125 ml. of dry toluene is added slowly 3.55 g. of a 50% dispersion of sodium hydride in mineral oil. Following the vigorous reaction, the mixture is refluxed for an hour, cooled and treated with 8.0 g. of freshly distilled 2-dimethylaminoethyl chloride. Subsequently, the mixture is heated at 85° for 16 hours, cooled and filtered. The filtrate is washed with water and then with 10% aqueous hydrochloric acid. The aqueous hydrochloric acid extract is cooled to 0° to yield the trihydrochloride salt.

(b) *Preparation of the free base.*—The trihydrochloride obtained in step *a* is added with cooling to an excess of 40% aqueous potassium hydroxide, and the liberated oil extracted into ether. The ether extracts are concentrated to give 4-{3-[2-(trifluoromethyl)phenothiazine-10- yl]propyl}piperazinoethyl 2-dimethylaminoethyl ether as a pale yellow oil.

EXAMPLE 2

*4-[3-(2-chlorophenothiazin-10-yl)propyl]piperazinoethyl 2-dimethylaminoethyl ether*

Following the procedure of Example 1 but substituting an equivalent amount of 4-[3-(2-chlorophenothiazin-10-yl)propyl]piperazinoethanol for the piperazinoethanol used in the example, 4-[3-(2-chlorophenothiazin-10-yl)propyl]piperazinoethyl 2-dimethylaminoethyl ether is formed.

EXAMPLE 3

*4-[3-(phenothiazin-10-yl)propyl]piperazinoethyl 2-dimethylaminoethyl ether*

Following the procedure of Example 1 but substituting an equivalent amount of 4-[3-(phenothiazin-10-yl)propyl]piperazinoethanol for the piperazinoethanol used in the example, 4-[3-(phenothiazin-10-yl)propyl]piperazinoethyl 2-dimethylaminoethyl ether is formed.

In a similar manner by substituting the indicated 2-substituted phenothiazine for the piperazinoethanol used in Example 1 and following the procedure of the example, the indicated 2-substituted phenothiazine ether is formed:

| Example | Starting Material | Product Formed 2-dimethylaminoethyl ether of— |
|---|---|---|
| 4 | 4-[3-(2-methylphenothiazin-10-yl)-propyl]piperazinoethanol. | 4-[3-(2-methylphenothiazin-10-yl)propyl]piperazinoethyl. |
| 5 | 4-[3-(2-methoxyphenothiazin-10-yl)propyl]piperazinoethanol. | 4-[3-(2-methoxyphenothiazin-10-yl)propyl]piperazinoethyl. |
| 6 | 4-[3-(2-propionylphenothiazin-10-yl)propyl]piperazinoethanol. | 4-[3-(2-propionylphenothiazin-10-yl)propyl]piperazinoethyl. |
| 7 | 4-{3-[2-(methylmercapto)phenothiazin-10-yl]propyl}piperazinoethanol. | 4-{3-[2-(methylmercapto)phenothiazin-10-yl]propyl}piperazinoethyl. |
| 8 | 4-{3-[2-(trifluoromethylmercapto)-phenothiazin-10-yl]propyl}-piperazinoethanol. | 4-{3-[2-(trifluoromethylmercapto)-phenothiazin-10-yl]propyl}-piperazinoethyl. |
| 9 | 4-{3-[2-(trifluoromethoxy)phenothiazin-10-yl]propyl}piperazinoethanol. | 4-{3-[2-(trifluoromethoxy)phenothiazin-10-yl]propyl}piperazinoethyl. |
| 10 | 4-{3-[2-(methylsulfonyl)phenothiazin-10-yl]propyl}piperazinoethanol. | 4-{3-[2-(methylsulfonyl)-phenothiazin-10-yl]propyl}piperazinoethyl. |
| 11 | 4-{3-[2-(N,N-dimethylaminosulfonyl)phenothiazin-10-yl]propyl}piperazinoethanol. | 4-{3-[2-(N,N-dimethylaminosulfonyl)phenothiazin-10-yl]propyl}piperazinoethyl. |

EXAMPLE 12

*4-{3-[2-(trifluoromethyl)phenothiazin-10-yl]propyl}-piperazinoethoxyethyl 2-dimethylaminoethyl ether*

Following the procedure of Example 1 but substituting an equivalent amount of 4-{3-[2-(trifluoromethyl)phenothiazin-10-yl]propyl}-piperazinoethoxyethanol for the piperazinoethanol used in the example, 4-{3-[2-(trifluoromethyl)phenothiazin - 10-yl]propyl} - piperazino-ethoxyethyl 2-dimethylaminoethyl ether is formed.

EXAMPLE 13

*4 - {3 - [2-(trifluoromethyl)phenothiazin-10-yl]propyl}-piperazinoethyl 2-dimethylaminoethyl ether, trimaleate salt*

A solution of 32.6 g. of the pale yellow oil obtained in Example 1b in 225 ml. of warm acetonitrile and 22.5 g. of maleic acid in 225 ml. of boiling acetonitrile are combined with vigorous stirring. The clear solution is allowed to cool slowly, then cooled in ice, and the solid filtered. The dried solid is recrystallized from isopropanol to give about 46 g. of 4-{3-[2-(trifluoromethyl)phenothiazin-10-yl]propyl}-piperazinoethyl 2-dimethylaminoethyl ether, trimaleate salt, M.P. about 143°.

EXAMPLE 14

*4-{3-[2-(trifluoromethyl)phenothiazin-10-yl]propyl}-piperazinoethyl 3-piperidinopropyl ether*

Following the procedure of Example 1 but substituting an equivalent amount of 3-piperidinopropyl chloride for the 2-dimethylaminoethyl chloride, 4-{3-[2-(trifluoromethyl)phenothiazin-10-yl]propyl}-piperazinoethyl 3-piperidinopropyl ether is obtained.

EXAMPLE 15

*4-{3-[2-(trifluoromethyl)phenothiazin-10-yl]propyl}-piperazinoethyl 3-methylaminopropyl ether*

Following the procedure of Example 1 but substituting an equivalent amount of 3-methylaminopropyl chloride for the 2-dimethylaminoethyl chloride, 4-{3-[2-(trifluoromethyl)phenothiazin - 10-yl]-propyl}-piperazinoethyl 3-methylaminopropyl ether is obtained.

EXAMPLE 16

*4-{3-[2-(trifluoromethyl)phenothiazin-10-yl]propyl}-piperazinoethyl 3-($N^4$-methylpiperazino)propyl ether*

Following the procedure of Example 1 but substituting an equivalent amount of 3-($N^4$-methylpiperazino)propyl chloride for the 2-dimethylaminoethyl chloride, there is obtained 4-{3-[2-(trifluoromethyl)-phenothiazin-10-yl]propyl}-piperazinoethyl 3-($N^4$-methylpiperazino)-propyl ether.

In a similar manner, by substituting the indicated aminoalkyl chloride for the 2-dimethylaminoethyl chloride in the procedure of Example 1, the indicated ether of 4-{3-[2-(trifluoromethyl)phenothiazin - 10-yl]propyl}piperazinoethyl is obtained:

| Example | Starting Material | Ether Formed |
|---|---|---|
| 17 | 2-(2-hydroxyethyl)aminoethyl chloride (prepared from 2-aminoethanol and ethylene chlorobromide). | 2-(2-hydroxyethyl)aminoethyl. |
| 18 | 4-di(2-hydroxyethyl)aminobutyl chloride (prepared from diethanolamine and tetramethylene chlorobromide). | 4-di(2-hydroxyethyl)aminobutyl. |
| 19 | 3-morpholinopropyl chloride. | 3-morpholinopropyl. |
| 20 | 2-homopiperidinoethyl chloride. | 2-homopiperidinoethyl. |
| 21 | 3-($N^4$-ethylhomopiperazino)-propyl chloride (prepared from $N^4$-ethylhomopiperazine and trimethylene chlorobromide). | 3-($N^4$-ethylhomopiperazino)propyl. |
| 22 | 5-thiamorpholinopentyl chloride (prepared from thiamorpholine and pentamethylene chlorobromide). | 5-thiamorpholinopentyl. |
| 23 | 2-diethylaminoethyl chloride. | 2-diethylaminoethyl. |
| 24 | 2-(N-methyl-N-isopropylamino)ethyl chloride. | 2-(N-methyl-N-isopropylamino)ethyl. |

EXAMPLE 25

*4 - {3 - [2 - (trifluoromethyl)phenothiazin - 10 - yl]propyl} - piperazinoethyl 3 - {$N^4$ - [2 - (heptanoyloxy)ethyl]piperazino}propyl ether*

(a) *Preparation of 2-bromoethyl heptanoate.*—To 125 g. of 2-bromoethanol in 500 ml. of dry chloroform is added dropwise, 148.5 g. of heptanoyl chloride. Subsequently the mixture is refluxed for four hours and the chloroform distilled to give 2-bromoethyl heptanoate.

(b) *Preparation of $N^4$-[2-(heptanoyloxy)ethyl]piperazine.*—To 17.6 g. of anhydrous piperazine, 13.8 g. of anhydrous potassium carbonate and 250 ml. of anhydrous methyl ethyl ketone is added dropwise and with stirring 23.7 g. of 2-bromoethyl heptanoate. Subsequently, the mixture is stirred and refluxed for sixteen hours, the solvent is distilled, and the residue dissolved in 100 ml. of water. The solution is cooled, excess 20% aqueous hydrochloric acid added and the mixture extracted with ether. The aqueous solution is neutralized saturated with sodium chloride and extracted with ether. The ether extracts are dried and concentrated to give $N^4$-[2-(heptanoyloxy)ethyl]piperazine.

(c) *Preparation of 3-{$N^4$-[2-(heptanoyloxy)ethyl] piperazino}propanol.*—To 24.2 g. of $N^4$-[2-(heptanoyloxy)ethyl]piperazine is added 100 ml. of anhydrous benzene, 17.1 g. of anhydrous barium hydroxide and 13.9 g. of 3-bromopropanol and the mixture stirred and refluxed for eighteen hours. The mixture is cooled, filtered and the benzene distilled to give 3-{$N^4$-[2-(heptanoyloxy) ethyl]piperazino}propanol.

(d) *Preparation of 4-{3-[2-(trifluoromethyl)phenothiazin-10-yl]propyl}piperazino ethyl chloride.*—To 21.9 g. of 4-{3-[2-(trifluoromethyl)phenothiazin-10-yl]propyl}piperazinoethanol in 250 ml. of dry benzene is added 7.1 g. of thionyl chloride. The mixture is kept overnight, heated for three hours under reflux, cooled and treated with an excess of ethereal hydrogen chloride. The precipitated solid is filtered and recrystallized from absolute ethanol-anhydrous ether to give 10.4 g. of 4-{3-[2-(trifluoromethyl)phenothiazin - 10 - yl]propyl}piperazinoethyl chloride as the dihydrochloride salt, M.P. 224–225° (dec.).

(e) *Preparation of 4-{3-[2-(trifluoromethyl)phenothiazin - 10 - yl]propyl} - piperazinoethyl 3 - {$N^4$ - [2-(heptanoyloxy)ethyl]-piperazino}propyl ether.*—To 9.05 g. of 4 - {3 - [2 - (trifluoromethyl)phenothiazin - 10 - yl]propyl}piperazinoethyl chloride is added 6.0 g. of the product from (c), 50 ml. of dry benzene and 3.42 g. of anhydrous barium hydroxide. The mixture is stirred and refluxed for eighteen hours to give 4-{3-[2-(trifluoromethyl)phenothiazin-10-yl]propyl}-piperazinoethyl 3-{$N^4$-[2-heptanoyloxy)ethyl]piperazino}propyl ether.

Similarly, by substituting in Example 25c, equivalent amounts of 2-hydroxyethylpiperazine or 2-(hydroxyethoxy)ethylpiperazine for the $N^4$-[2-heptanoyloxy)ethyl]piperazine, there are obtained 3-{$N^4$[2-(hydroxyethyl)]piperazino}propanol and 3-{$N^4$-[2-(hydroxyethoxy) ethyl]piperazino}propanol, respectively.

Similarly, by substituting in Example 25e, equivalent amounts of 3-{$N^4$-[2-hydroxyethyl)]piperazino}propanol or 3-{$N^4$-[2-(hydroxyethoxy)ethyl]piperazino}propanol for the 3-{$N^4$-[2-heptanoyloxy)ethyl]piperazino}propanol, there are obtained 4-{3-[2-(trifluoromethyl)phenothiazin-10-yl]propyl}piperazinoethyl 3-{$N^4$-[2-hydroxyethyl)]piperazino}propyl ether and 4-{3-[2-trifluoromethyl)phenothiazin - 10 - yl]propyl}piperazinopropyl 3-{$N^4$-[2-(hydroxyethoxy)ethyl]piperazino}propyl ether, respectively.

This invention may be variously otherwise embodied within the scope of the appended claims.

What is claimed is:

1. A compound selected from the group consisting of bases of the formula

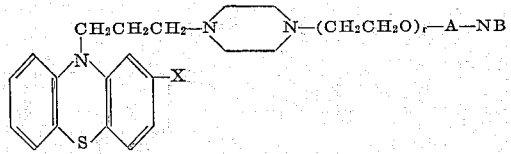

wherein $r$ is a positive integer less than three, A is lower alkylene of at least two carbon atoms, NB is selected from the group consisting of amino, (lower alkyl)amino, di(lower alkyl)amino, (hydroxy-lower alkyl)amino, di-(hydroxy-lower alkyl)amino, and basic saturated 5 to 7 membered monocyclic N-heterocyclic radicals of less than seventeen carbon atoms, and X is selected from the group consisting of hydrogen, halogen, trifluoromethyl, lower alkyl, lower alkoxy, lower alkanoyl, lower alkylmercapto, trifluoromethylmercapto, trifluoromethoxy, N,N-dimethylaminosulfonyl and lower alkylsulfonyl; and non-toxic acid-addition salts thereof.

2. 4 - {3 - [2 - (trifluoromethyl)phenothiazin - 10 - yl] propyl}piperazinoethyl 2-di(lower alkyl)amino(lower alkyl)ether.

3. 4 - {3 - [2 - (trifluoromethyl)phenothiazin - 10 - yl] propyl}piperazinoethyl 2-dimethylaminoethyl ether.

4. A non-toxic acid-addition salt of the compound of claim 3.

5. The hydrochloride salt of the compound of claim 3.

6. 4 - [3 - (2 - chlorophenothiazin - 10 - yl)propyl] piperazinoethyl 2-di(lower alkyl)amino(lower alkyl) ether.

7. 4 - [3 - (2 - chlorophenothiazin - 10 - yl)propyl] piperazinoethyl 2-dimethylaminoethyl ether.

8. A non-toxic acid-addition salt of the compound of claim 2.

9. A non-toxic acid-addition salt of the compound of claim 6.

10. A non-toxic acid-addition salt of the compound of claim 7.

References Cited by the Examiner

UNITED STATES PATENTS 2,979,502  4/1961  Gailliot et al. _____ 260—243

FOREIGN PATENTS 824,598  12/1959  Great Britain.

JOHN D. RANDOLPH, *Primary Examiner.*